US012695572B2

(12) United States Patent
Wang et al.

(10) Patent No.: US 12,695,572 B2
(45) Date of Patent: Jul. 28, 2026

(54) COLLISION HANDLING FOR SOUNDING REFERENCE SIGNAL (SRS) TRANSMISSION

(71) Applicant: Intel Corporation, Santa Clara, CA (US)

(72) Inventors: Guotong Wang, Santa Clara, CA (US); Alexei Davydov, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 18/558,347

(22) PCT Filed: Aug. 4, 2022

(86) PCT No.: PCT/US2022/039470
§ 371 (c)(1),
(2) Date: Oct. 31, 2023

(87) PCT Pub. No.: WO2023/014910
PCT Pub. Date: Feb. 9, 2023

(65) Prior Publication Data
US 2024/0235772 A1 Jul. 11, 2024

(30) Foreign Application Priority Data

| | | |
|---|---|---|
| Aug. 6, 2021 | (WO) | ................ PCT/CN2021/111196 |
| Nov. 16, 2021 | (WO) | ................ PCT/CN2021/130947 |
| Nov. 18, 2021 | (WO) | ................ PCT/CN2021/131456 |

(51) Int. Cl.
*H04L 5/00* (2006.01)

(52) U.S. Cl.
CPC ............ *H04L 5/0051* (2013.01); *H04L 5/001* (2013.01)

(58) Field of Classification Search
None
See application file for complete search history.

(56) References Cited

U.S. PATENT DOCUMENTS

| | | | | |
|---|---|---|---|---|
| 2019/0190582 A1* | 6/2019 | Guo | ..................... | H04B 17/327 |
| 2019/0349972 A1* | 11/2019 | Nam | ..................... | H04B 7/0608 |
| 2020/0204323 A1* | 6/2020 | Kim | ..................... | H04L 5/0048 |
| 2020/0322187 A1 | 10/2020 | He et al. | | |

(Continued)

OTHER PUBLICATIONS

International Patent Office—International Search Report and Written Opinion mailed Nov. 21, 2022, from International Patent Application No. PCT/US2022/039470, 12 pages.

(Continued)

*Primary Examiner* — Phirin Sam
(74) *Attorney, Agent, or Firm* — Gray Ice Higdon, PLLC

(57) ABSTRACT

Systems, apparatus, methods, and computer-readable media provided for collision handling for sounding reference signal (SRS) transmission include one or more processors to receive configuration information for a first sounding reference signal (SRS) resource set and a second SRS resource set, wherein there is a guard period between SRS occasions of the first SRS resource set and respective SRS occasions of the second SRS resource set, determine that a first SRS occasion of the first SRS resource set and a second SRS occasion of the second SRS resource set are dropped based on a collision handling rule and encode an uplink message for transmission in the guard period between the first and second SRS occasions based on the determination.

20 Claims, 11 Drawing Sheets

1000 receiving configuration information for a first sounding reference signal (SRS) resource set and a second SRS resource set, wherein there is a guard period between SRS occasions of the first SRS resource set and respective SRS occasions of the second SRS resource set
1002 determining that a first SRS occasion of the first SRS resource set and a second SRS occasion of the second SRS resource set are dropped based on a collision handling rule
1004 encoding an uplink message for transmission in the guard period between the first and second SRS occasions based on the determination
1006

(56) References Cited

U.S. PATENT DOCUMENTS

| | | | | |
|---|---|---|---|---|
| 2021/0235394 A1* | 7/2021 | Dinan | ................. | H04W 52/243 |
| 2022/0116979 A1* | 4/2022 | Park | ..................... | H04L 5/0053 |
| 2022/0360405 A1* | 11/2022 | Jiang | .................... | H04L 5/0094 |
| 2023/0103831 A1* | 4/2023 | Rahman | ................ | H04L 5/0057 |
| | | | | 370/330 |
| 2023/0300770 A1* | 9/2023 | Liu | ..................... | H04B 7/1853 |
| | | | | 370/350 |
| 2023/0396373 A1* | 12/2023 | Gao | ...................... | H04L 1/1861 |
| 2024/0172134 A1* | 5/2024 | Khoshnevisan | .... | H04W 52/365 |
| 2024/0283575 A1* | 8/2024 | Zhang | ................. | H04L 1/1854 |
| 2025/0089056 A1* | 3/2025 | Cirik | .................... | H04L 5/0051 |

OTHER PUBLICATIONS

Qualcomm Incorporated, "Discussion on SRS enhancement," 3GPP TSG-RAN WG1 Meeting #104bis-e, R1-2103155, Apr. 12-20, 2021, e-Meeting, 28 pages.

Lenovo, et al., "Enhancements on SRS," 3GPP TSG RAN WG1#104bis-e, R1-2102842, Agenda Item: 8.1.3, Apr. 12-20, 2021, e-Meeting, 13 pages.

Ericsson, "SRS Performance and Potential Enhancements," 3GPP TSG-RAN WG1 Meeting #104b-e, Tdoc R1-2103444, Agenda Item: 8.1.3, Apr. 12-20, 2021, e-Meeting, 20 pages.

Ericsson, "SRS Performance and Potential Enhancements," 3GPP TSG-RAN WG1 Meeting #104-e, Tdoc R1-2101519, Agenda Item: 8.1.3, Jan. 25-Feb. 5, 2021, e-Meeting, 25 pages.

* cited by examiner

```
SRS-ResourceSet ::=              SEQUENCE {
srs-ResourceSetId                SRS-ResourceSetId,
srs-ResourceIdList               SEQUENCE (SIZE(1..maxNrofSRS-ResourcesPerSet))  OF SRS-ResourceId    OPTIONAL,  -- Cond Setup
resourceType                     CHOICE {
    aperiodic                        SEQUENCE {
        aperiodicSRS-ResourceTrigger     INTEGER  (1..maxNrofSRS-TriggerStates-1),
        csi-RS                           NZP-CSI-RS-ResourceId                              OPTIONAL,  -- Cond NonCodebook
        slotOffset                       INTEGER (1..32)                                    OPTIONAL,  -- Need S
        ...,
        [[
        aperiodicSRS-ResourceTriggerList     SEQUENCE (SIZE(1..maxNrofSRS-TriggerStates-2))
                                             OF INTEGER  (1..maxNrofSRS-TriggerStates-1)    OPTIONAL  -- Need M
        ]]
    },
    semi-persistent                  SEQUENCE {
        associatedCSI-RS                 NZP-CSI-RS-ResourceId                              OPTIONAL,  -- Cond NonCodebook
        ...
    },
    periodic                         SEQUENCE {
        associatedCSI-RS                 NZP-CSI-RS-ResourceId                              OPTIONAL,  -- Cond NonCodebook
        ...
    }
},
usage                            ENUMERATED  {beamManagement, codebook, nonCodebook, antennaSwitching},
alpha                            Alpha                                                 OPTIONAL,  -- Need S
p0                               INTEGER  (-202..24)                                   OPTIONAL,  -- Cond Setup
pathlossReferenceRS              PathlossReferenceRS-Config                            OPTIONAL,  -- Need M
srs-PowerControlAdjustmentStates ENUMERATED { sameAsFci2,  separateClosedLoop}        OPTIONAL,  -- Need S
...,
[[
pathlossReferenceRSList-r16      SetupRelease { PathlossReferenceRSList-r16}           OPTIONAL  -- Need M
]]
}
```

Figure 1

900 determining that multiple aperiodic SRS resource sets are triggered to be transmitted in a same slot across different component carriers (CCs)
902 dropping transmission of one or more of the SRS resource sets according to a dropping rule
904

1000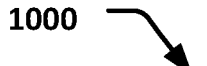

receiving configuration information for a first sounding
reference signal (SRS) resource set and a second SRS
resource set, wherein there is a guard period between SRS
occasions of the first SRS resource set and respective SRS
occasions of the second SRS resource set
1002 determining that a first SRS occasion of the first SRS
resource set and a second SRS occasion of the second SRS
resource set are dropped based on a collision handling
rule
1004 encoding an uplink message for transmission in the guard
period between the first and second SRS occasions based
on the determination
1006

Figure 10

1100 determining to drop a first sounding reference signal (SRS)
occasion of a first SRS resource set and a second SRS
occasion of a second SRS resource set based on a collision
handling rule, wherein the first and second SRS occasions
are in different component carriers
1102 dropping a gap period between the first and second SRS
occasions based on the determination
1104

COLLISION HANDLING FOR SOUNDING REFERENCE SIGNAL (SRS) TRANSMISSION

CROSS REFERENCE TO RELATED APPLICATION

The present application is a national phase entry under 35 U.S.C. § 371 of International Application No. PCT/US2022/039470, filed Aug. 4, 2022, entitled "COLLISION HANDLING FOR SOUNDING REFERENCE SIGNAL (SRS) TRANSMISSION," which claims priority to International Patent Application No. PCT/CN2021/111196, which was filed Aug. 6, 2021; International Patent Application No. PCT/CN2021/130947, which was filed Nov. 16, 2021; and to International Patent Application No. PCT/CN2021/131456, which was filed Nov. 18, 2021, the entire disclosures of which are hereby incorporated by reference.

FIELD

Various embodiments generally may relate to the field of wireless communications. For example, some embodiments may relate to collision handling for sounding reference signal (SRS) transmission.

BACKGROUND

In the 3GPP New Radio (NR) Release (Rel)-15 spec, different types of SRS resource sets are supported. The SRS resource set is configured with a parameter of 'usage', which can be set to 'beamManagement', 'codebook', 'nonCode-book' or 'antennaSwitching'. The SRS resource set configured for 'beamManagement' is used for beam acquisition and uplink beam indication using SRS. The SRS resource set configured for 'codebook' and 'nonCodebook' is used to determine the uplink (UL) precoding with explicit indication by transmission precoding matrix index (TPMI) or implicit indication by SRS resource index (SRI). Finally, the SRS resource set configured for 'antennaSwitching' is used to acquire downlink (DL) channel state information (CSI) using SRS measurements in the UE by leveraging reciprocity of the channel in time domain duplexing (TDD) systems. For SRS transmission, the time domain behavior could be periodic, semi-persistent or aperiodic.

BRIEF DESCRIPTION OF THE FIGURES

FIG. 1 illustrates a radio resource control (RRC) configuration for a sounding reference signal (SRS) resource set.

FIGS. 9, 10, and 11 illustrate example processes of a user equipment (UE) in accordance with various embodiments.

DETAILED DESCRIPTION

Figure 2:
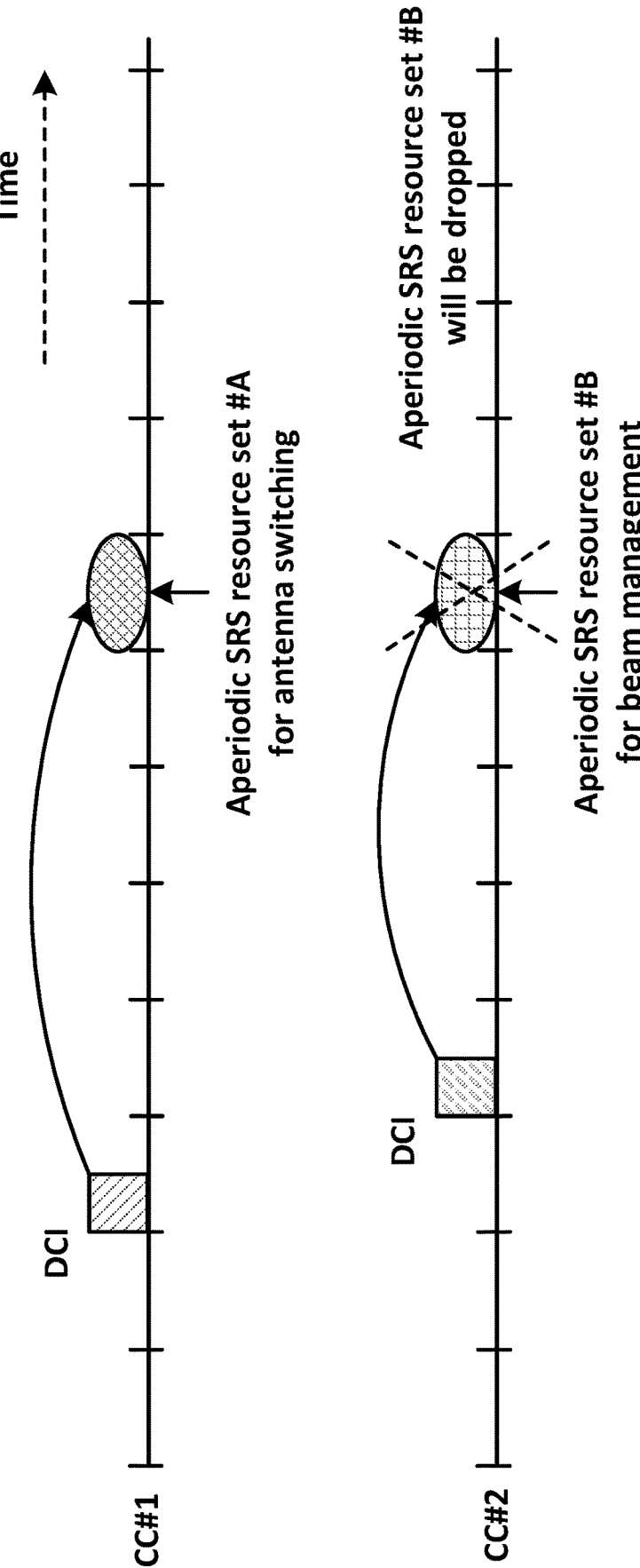
FIG. 2 illustrates collision handling among aperiodic SRS across different component carriers (CCs), in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

As discussed above, in the 3GPP NR Rel-15 specification, different types of SRS resource sets are supported. The SRS resource set is configured with a parameter of 'usage', which can be set to 'beamManagement', 'codebook', 'nonCode-book' or 'antennaSwitching'. The SRS resource set configured for 'beamManagement' is used for beam acquisition and uplink beam indication using SRS. The SRS resource set configured for 'codebook' and 'nonCodebook' is used to determine the UL precoding with explicit indication by TPMI or implicit indication by SRI. Finally, the SRS resource set configured for 'antennaSwitching' is used to acquire DL CSI using SRS measurements in the UE by leveraging reciprocity of the channel in TDD systems. For SRS transmission, the time domain behavior could be periodic, semi-persistent or aperiodic. FIG. 1 shows an example of the radio resource control (RRC) configuration for an SRS resource set.

When SRS resource set is configured as 'aperiodic', the SRS resource set also includes configuration of trigger state(s) (aperiodicSRS-ResourceTrigger, aperiodicSRS-ResourceTriggerList). The triggering state(s) defines which DCI codepoint(s) triggers the corresponding SRS resource set transmission.

In 3GPP Rel-17 and/or another future specification, the DCI may indicate an available uplink slot for transmission of the triggered SRS. In carrier aggregation, it is possible that multiple aperiodic SRS resource sets are triggered to be transmitted in the same slot over different component carriers (CCs). The current SRS collision handling does not consider the collision among aperiodic SRS resource sets across different carriers.

Various embodiments herein provide techniques for collision handling among aperiodic SRS across different carriers, e.g., including one or more dropping rules. In some embodiments, if the SRS transmission is prior to or after PUSCH/PUCCH, and the beam/antenna/panel switching is required between the transmission of SRS and PUSCH/PUCCH, then a guard period may be configured. Additionally, or alternatively, if the time between SRS and PUSCH/

PUCCH is not sufficient for beam/antenna/panel switching, then a dropping rule may be defined to handle the collision. Collision Among SRS in Carrier Aggregation In an embodiment, when multiple aperiodic SRS resource sets are triggered to be transmitted in the same slot across different component carriers (CCs), if the simultaneous transmission over multiple CCs exceeds UE's capability, there should be some rules to handle the collision.

In one example, the SRS prioritization is based on SRS usage. For example, the prioritization of usage is {antenna switching}>{codebook/non-codebook}>{beam management}. If the collision happens among SRS with the same usage, then the SRS could be further prioritized by component carrier ID or SRS resource set ID.

As shown in FIG. 2, the SRS resource set #A over CC #1 and SRS resource set #B over CC #2 are triggered to be sent in the same time slot. Since SRS resource set #A is for antenna switching, it is prioritized for transmission and SRS resource set #B is dropped.

In another example, the SRS prioritization is based on component carrier ID, e.g., the SRS over CC with higher ID or lower ID should be prioritized.

In another example, the SRS prioritization is based on SRS resource set ID, e.g., the SRS resource set with higher ID or lower ID should be prioritized.

In another embodiment, when aperiodic SRS triggered in one CC collides with periodic/semi-persistent SRS over another CC, if the simultaneous transmission over multiple CCs exceeds UE's capability, there should be some rules to handle the collision.

In one example, the aperiodic SRS should be prioritized over periodic/semi-persistent SRS. Or the periodic/semi-persistent SRS is prioritized.

In another example, the SRS prioritization is based on SRS usage. For example, the prioritization of usage is {antenna switching}>{codebook/non-codebook}>{beam management}. If the collision happens among SRS with the same usage, then the SRS could be further prioritized by component carrier ID or SRS resource set ID.

In another example, the SRS prioritization is based on component carrier ID, e.g., the SRS over CC with higher ID or lower ID should be prioritized.

In another example, the SRS prioritization is based on SRS resource set ID, e.g., the SRS resource set with higher ID or lower ID should be prioritized.

In another embodiment, when periodic SRS in one CC collides with semi-persistent SRS over another CC, if the simultaneous transmission over multiple CCs exceeds UE's capability, there should be some rules to handle the collision.

In one example, the semi-persistent SRS should be prioritized over periodic SRS. Or the periodic SRS is prioritized.

In another example, the SRS prioritization is based on SRS usage. For example, the prioritization of usage is {antenna switching}>{codebook/non-codebook}>{beam management}. If the collision happens among SRS with the same usage, then the SRS could be further prioritized by component carrier ID or SRS resource set ID.

In another example, the SRS prioritization is based on component carrier ID, e.g., the SRS over CC with higher ID or lower ID should be prioritized.

In another example, the SRS prioritization is based on SRS resource set ID, e.g., the SRS resource set with higher ID or lower ID should be prioritized.

In another embodiment, new UE capability could be introduced indicating whether the UE supports simultaneous aperiodic SRS transmission over multiple CCs. Another UE capability could be introduced indicating whether UE supports simultaneous aperiodic SRS/periodic SRS/semi-persistent SRS transmission over multiple CCs.

In another embodiment, if the UE doesn't support simultaneous transmission for aperiodic SRS over different CC, or simultaneous transmission for aperiodic and periodic/semi-persistent SRS over different CC, or simultaneous transmission for periodic and semi-persistent SRS over different CC, the UE is not expected to be configured with overlapped transmission.

Section B: Gap Period for SRS

In an embodiment, for SRS with antenna switching, if the UE needs to switch antenna panel when transmitting the SRS resources within the same SRS resource set, additional guard period, for example, N symbols (N should be larger than or equal to the panel switching time), should be configured between the SRS resources.

In another embodiment, for SRS with antenna switching, if the UE needs to switch antenna panel among different SRS resource sets, the guard period, for example, N symbols (N should be larger than or equal to the panel switching time), should be configured between the SRS resource sets.

In another embodiment, for SRS with antenna switching, if the SRS transmission is before or after other uplink transmission, e.g., PUSCH/PUCCH, and the UE needs to switch antenna/beam/panel between the SRS and PUSCH/PUCCH, the guard period, for example, N symbols (N should be larger than or equal to the beam/antenna/panel switching time), should be configured between the SRS and PUSCH/PUCCH. This embodiment can also be applied to two SRS resource sets, e.g., the guard period, for example, N symbols (N should be larger than or equal to the beam/antenna/panel switching time), should be configured between the SRS resource sets.

In another embodiment, for SRS with antenna switching, if the SRS transmission is before or after other uplink transmission, e.g., PUSCH/PUCCH, and the time between SRS and PUSCH/PUCCH is not sufficient for beam/antenna/panel switching, the collision handling should be applied.

Figure 3:
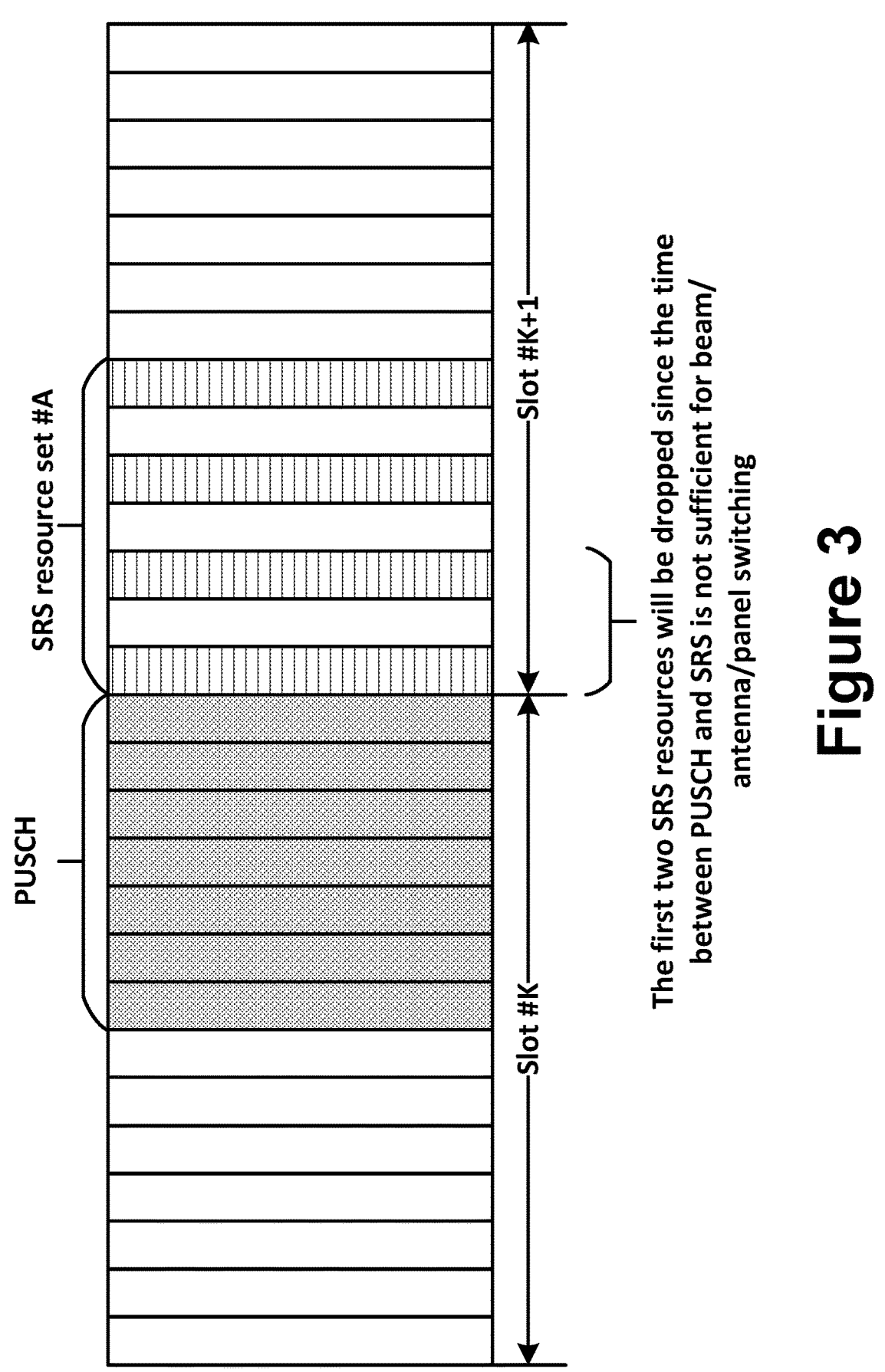
FIG. 3 illustrates dropping some orthogonal frequency division multiplexing (OFDM) symbols for SRS due to insufficient time between physical uplink shared channel (PUSCH) and SRS for beam/antenna/panel switching, in accordance with various embodiments.

In one example, the PUSCH/PUCCH should be prioritized for transmission. Some OFDM symbols for SRS transmission will be dropped. FIG. 3 shows an example of the operation.

In another example, the SRS should be prioritized for transmission. Some OFDM symbols for PUSCH/PUCCH will be dropped.

This embodiment can also be applied to two SRS resource sets, e.g., if the time between SRS resource sets is not sufficient for beam/antenna/panel switching, the collision handling should be applied. In one example, some OFDM symbols for the first or the second SRS resource set should be dropped. In some embodiments, the prioritization may be based on:

SRS usage, the SRS with certain usage should be prioritized, for example, antenna switching;
  SRS resource set ID, the SRS resource set with higher or lower ID should be prioritized; and/or
  SRS time domain behavior, the SRS resource set with certain time domain behavior should be prioritized, for example, aperiodic SRS resource set should be prioritized over periodic/semi-persistent SRS.

In another embodiment, for SRS with antenna switching, if the time period between two SRS resources is larger than the required gap length (e.g., the two SRS resources could be located in the same slot, or the two SRS resources could be located in two consecutive slots), then the OFDM symbols used for gap period should be predefined or configured by RRC/MAC-CE or indicated by DCI.

In one example, if the required gap is Y symbols and the time period between two SRS resources is larger than Y symbols, then the Y symbols following the first SRS resource should be used as gap period.

For example, the required gap length is 2 symbols, and the time period between the two SRS resources is 5 symbols, then the first two OFDM symbols after the first SRS resource is used as gap.

In another example, if the required gap is Y symbols and the time period between two SRS resources is larger than Y symbols, then the Y symbols prior to the second SRS resource should be used as gap period.

In another embodiment, for SRS with antenna switching, if the required gap is Y symbols and the time period between two SRS resources is larger than Y symbols (e.g., the two SRS resources could be located in the same slot, or the two SRS resources could be located in two consecutive slots), when performing collision handling, the OFDM symbols which are predefined/configured to be used as gap should be applied with the same priority handling rule as if SRS was configured.

For example, the required gap length is 2 symbols, and the time period between the two aperiodic SRS resources is 5 symbols, and the first two symbols after the first SRS resource is used as gap. When there is PUCCH carrying periodic CSI reports in the first two symbols after the first SRS resource, the PUCCH should be dropped.

In another embodiment, for SRS with antenna switching, if the required gap is Y symbols and the time period between two SRS resources is larger than Y symbols (the two SRS resources could be located in the same slot, or the two SRS resources could be located in two consecutive slots), then all the symbols between the two SRS resources are used as gap period, e.g., there is no other uplink signal/channel transmitted in the period between the two SRS resources.

When performing collision handling, all the OFDM symbols between the two SRS resources may be applied with the same priority handling rule as if SRS was configured.

In another embodiment, for SRS with antenna switching, if the required gap is Y symbols and the time period between two SRS resources is larger than Y symbols (e.g., the two SRS resources could be located in the same slot, or the two SRS resources could be located in two consecutive slots), other uplink transmission could happen in the period between the two SRS resources excluding the symbols which are predefined/configured to be used as gap. Alternatively, other uplink transmission may be performed in all the symbols between the two SRS resources.

In an embodiment, for SRS with antenna switching, during the gap period of Y symbol(s) between two SRS resource (the two SRS resources could be located in the same slot, or the two SRS resources could be located in two consecutive slots), the UE should not transmit any other uplink signal/channel, no matter the results of collision handling between the gap period and other signal/channel (or no matter the results of collision handling between SRS and other uplink signal/channel).

In another example, during the gap period, the UE could transmit other uplink signal/channel according to the results of collision handling between the gap period and other signal/channel (or according to the results of collision handling between SRS and other signal/channel). For example, if a first SRS occasion before the gap period and a second SRS occasion after the gap period are dropped, then another uplink message (e.g., PUSCH, PUCCH, etc.) may be transmitted in the gap period.

The interval between two SRS resources could be equal to or larger than the gap period of Y symbols. If the interval is larger than Y symbols, the position of the gap should be predefined or configured, or the entire interval is treated as gap period.

In another embodiment, for SRS with antenna switching, when the number of gap symbol(s) between two SRS resource is larger than one (the two SRS resources could be located in the same slot, or the two SRS resources could be located in two consecutive slots), all the symbols of the gap should be treated together for collision handling, e.g., all the gap symbols have the same priority. If any one of the gap symbols collides with other high priority signal/channel, then the entire gap period will be low priority. Alternatively, the collision handling for the gap period could be performed symbol by symbol.

In another embodiment, for SRS with antenna switching, during the gap period of Y symbol(s) between two SRS resource (the two SRS resources could be located in the same slot, or the two SRS resources could be located in two consecutive slots), the collision handling should be based on the first symbol of the gap period, e.g., the priority of the entire gap period is determined by the first symbol of the gap.

If the first symbol is high priority or there is no collision, then the entire gap period is high priority, e.g., the UE should not transmit any other uplink signal/channel in the entire gap period.

If the first symbol is low priority, then the entire gap period should be dropped.

Figure 4:
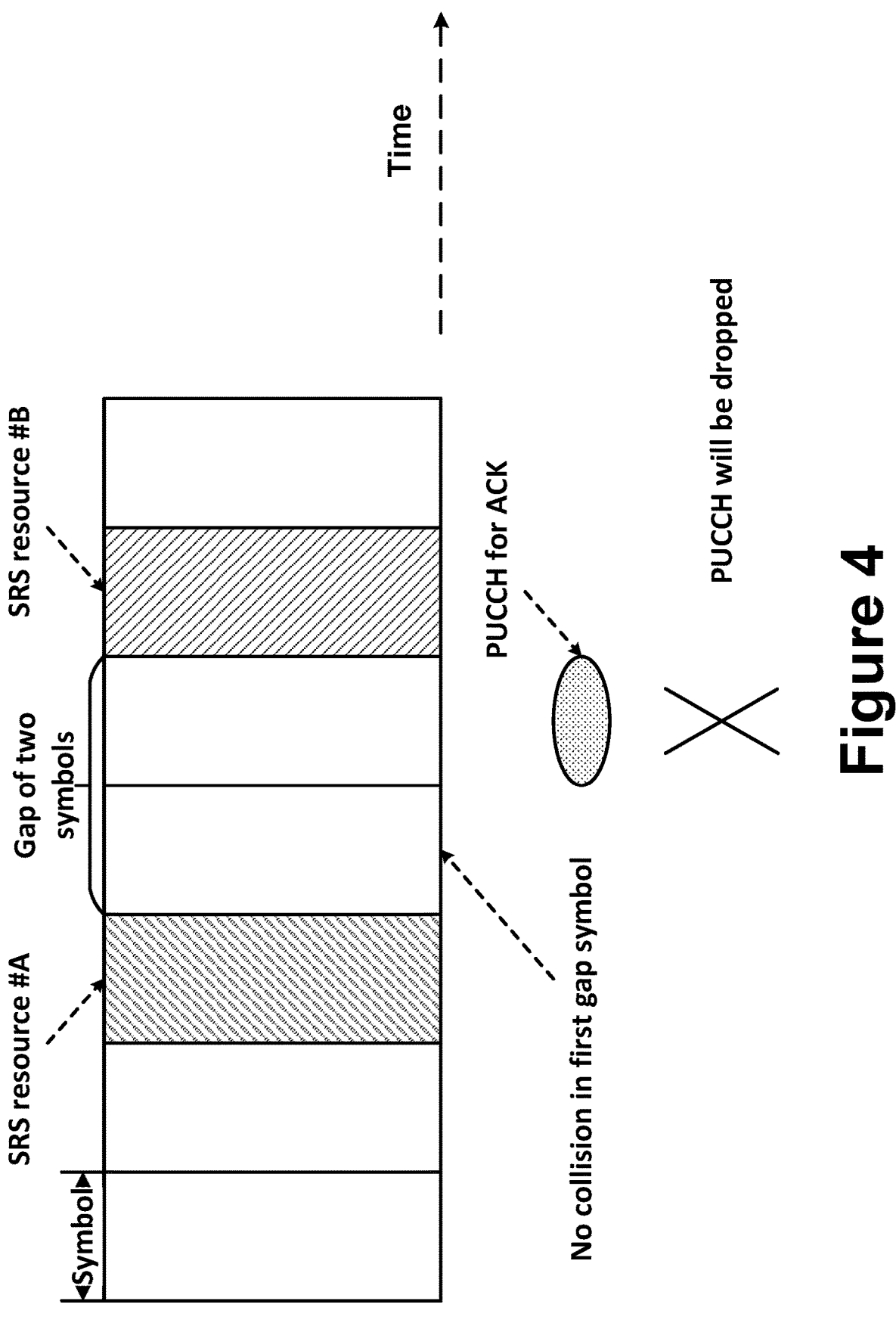
FIG. 4 illustrates an example of priority handling for a gap period (e.g., determined by the first gap symbol), in accordance with various embodiments.

FIG. 4 shows an example of the operation. There is collision between the $2^{nd}$ gap symbols and high priority PUCCH. But there is no collision in the $1^{st}$ gap symbol. In such case, the entire gap period will be high priority and the PUCCH will be dropped.

Alternatively, the priority of the entire gap period is determined by the last symbol of the gap.

In another embodiment, for SRS with antenna switching, the priority of the gap period of Y symbol(s) between two SRS resource (the two SRS resources could be located in the same slot, or the two SRS resources could be located in two consecutive slots) should follow the SRS resource prior to the gap period (or follow the last OFDM symbol of the SRS resource prior to the gap period).

For example, if the SRS resource prior to the gap period is high priority or there is no collision, then the entire gap period is high priority. The UE should not transmit any other uplink signal/channel in the entire gap period.

If the SRS resource prior to the gap is low priority, then the entire gap period should be dropped.

Figure 5:
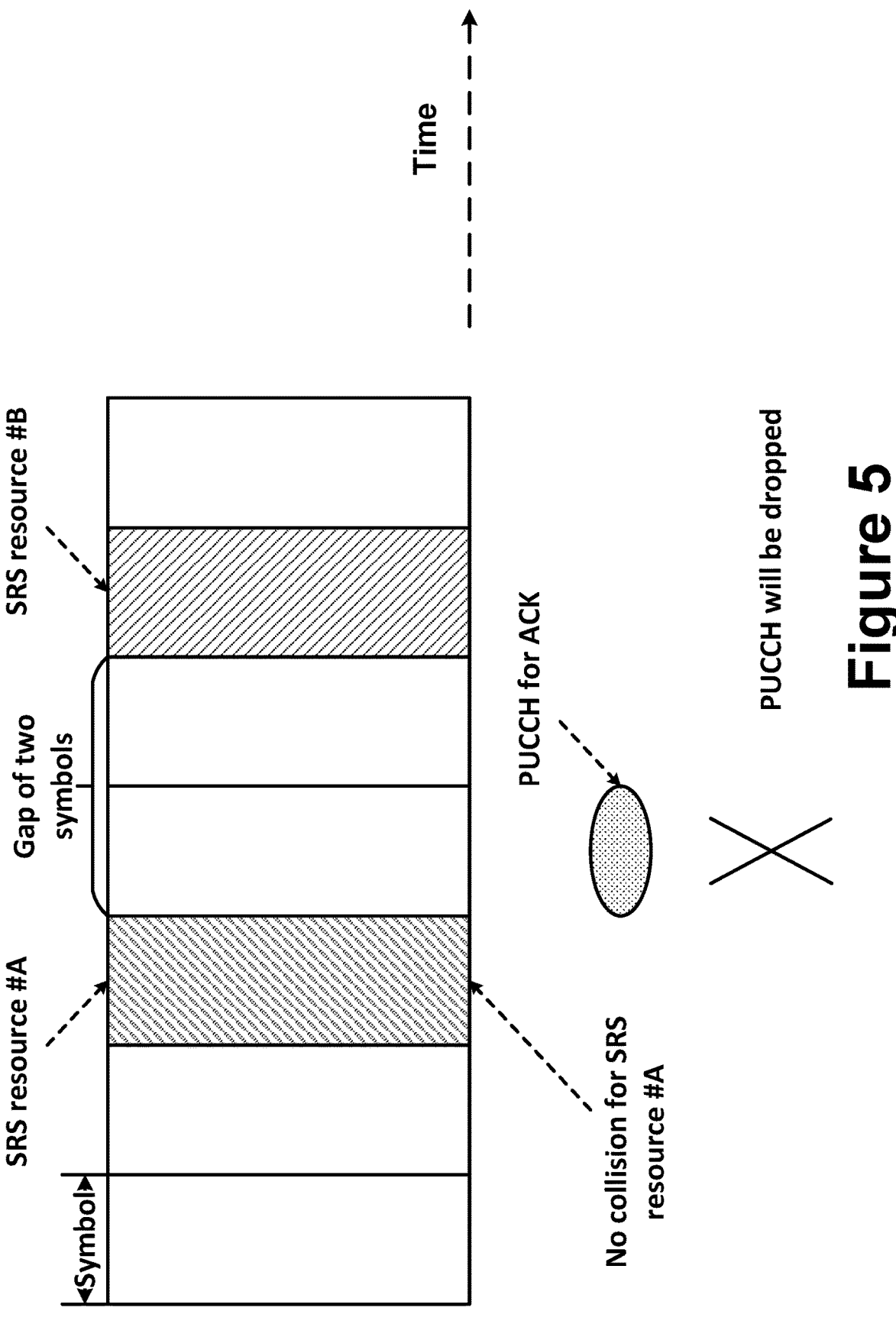
FIG. 5 illustrates an example of priority handling for a gap period (e.g., determined by the SRS prior to the gap), in accordance with various embodiments.

FIG. 5 shows an example of the operation.

In another example, the priority of the gap period should follow the SRS resource after the gap period (or follow the first OFDM symbols of the SRS resource after the gap period).

In another embodiment, all the SRS resources and the gap period should be treated together for collision handling, e.g., all the SRS resources and the gap period have the same priority.

These embodiments may be applied to aperiodic SRS, periodic SRS or semi-persistent SRS.

Additionally, the various embodiments herein may be applied to other SRS usages, such as codebook/non-codebook, beam management, etc.

Furthermore, while embodiments are described with reference to the entire SRS occasion or gap period being dropped, in other examples of the embodiments herein, when collision happens only the overlapped symbols are dropped (e.g., the non-overlapped symbols are still transmitted).

Systems and Implementations

Figure 6:
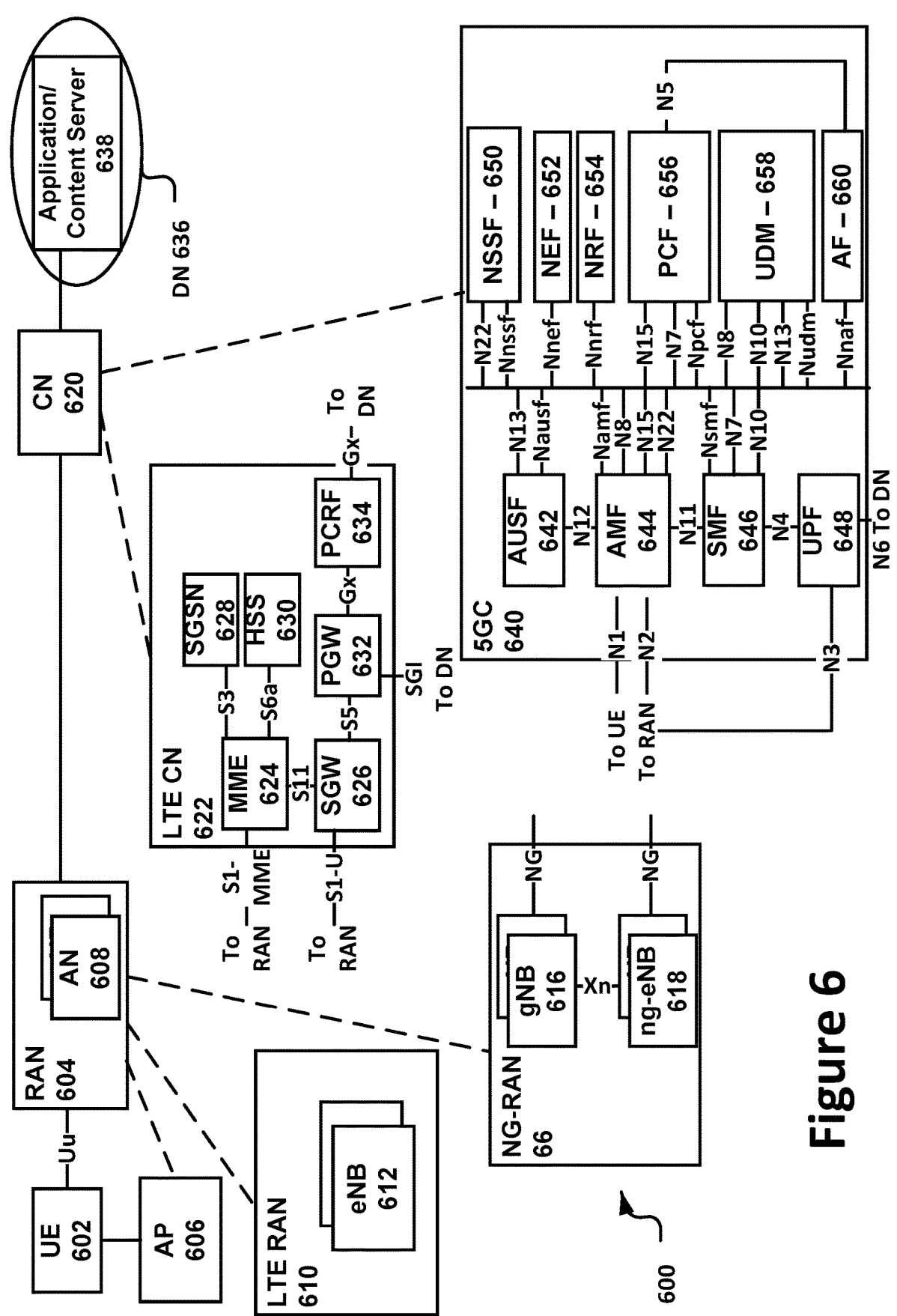
FIG. 6 illustrates a network in accordance with various embodiments.
Figure 7:
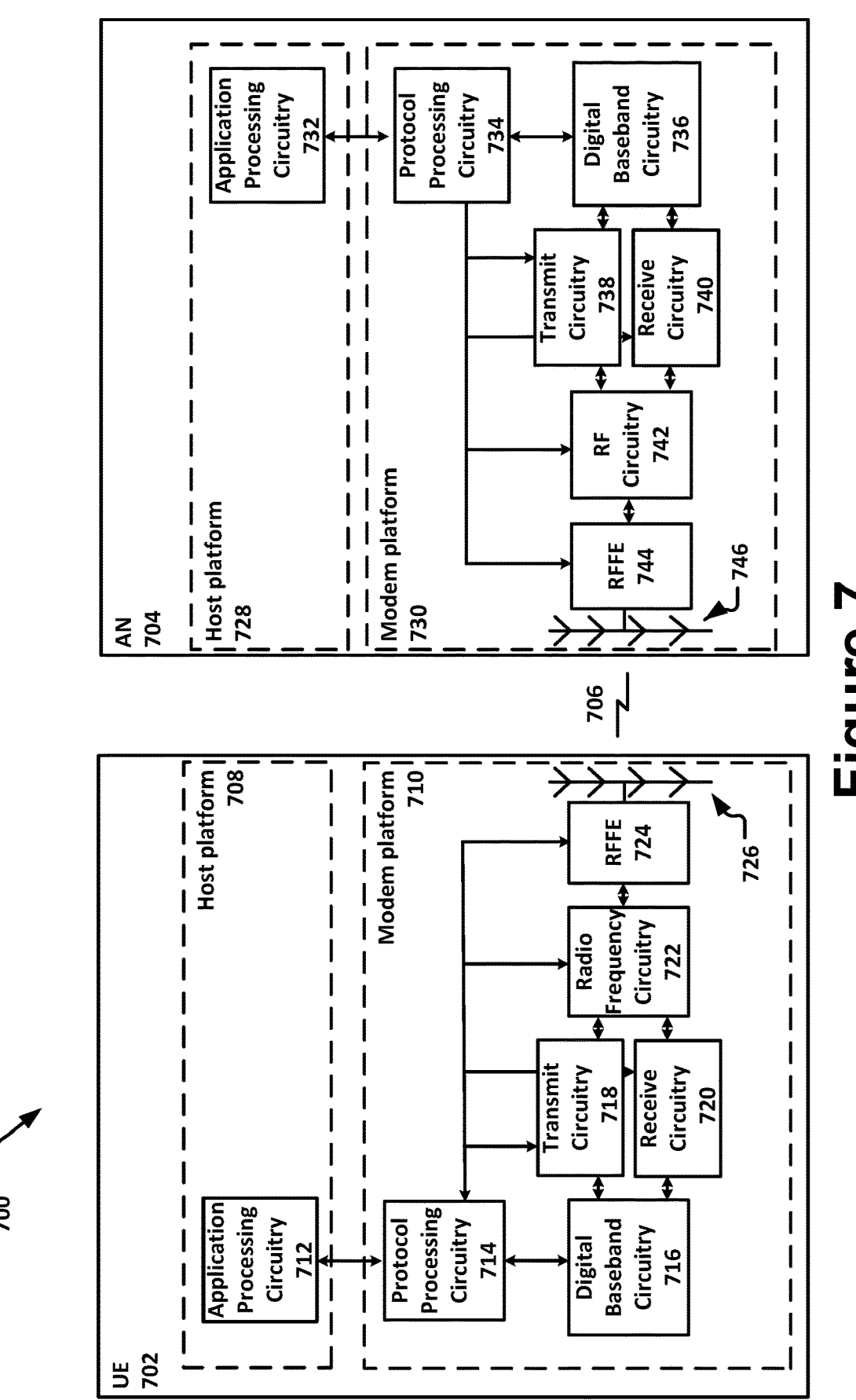
FIG. 7 schematically illustrates a wireless network in accordance with various embodiments.
Figure 8:
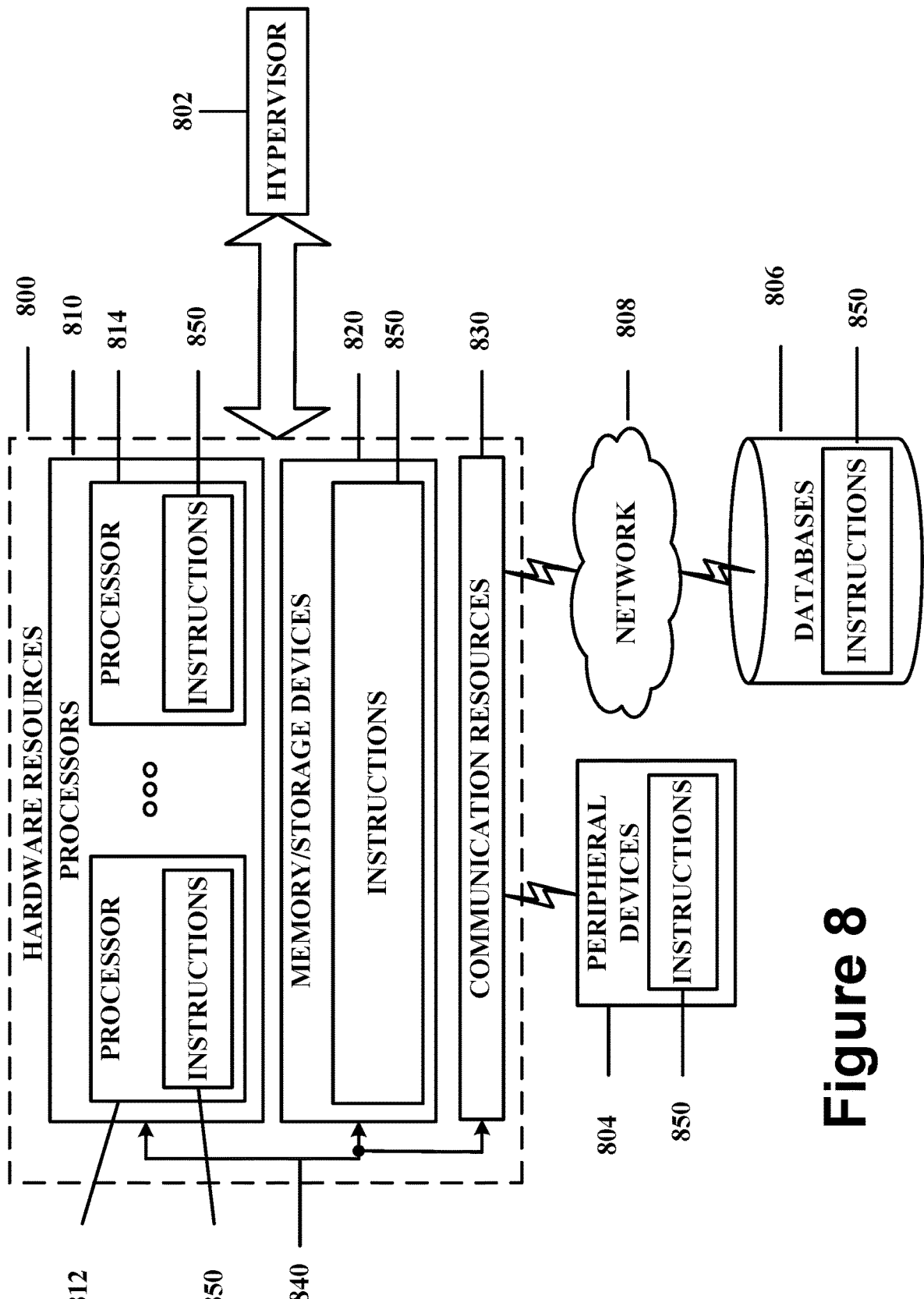
FIG. 8 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 6-8 illustrate various systems, devices, and components that may implement aspects of disclosed embodiments.

FIG. 6 illustrates a network 600 in accordance with various embodiments. The network 600 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 600 may include a UE 602, which may include any mobile or non-mobile computing device designed to communicate with a RAN 604 via an over-the-air connection. The UE 602 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 600 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 602 may additionally communicate with an AP 606 via an over-the-air connection. The AP 606 may manage a WLAN connection, which may serve to offload some/all network traffic from the RAN 604. The connection between the UE 602 and the AP 606 may be consistent with any IEEE 802.11 protocol, wherein the AP 606 could be a wireless fidelity (Wi-Fi®) router. In some embodiments, the UE 602, RAN 604, and AP 606 may utilize cellular-WLAN aggregation (for example, LWA/LWIP). Cellular-WLAN aggregation may involve the UE 602 being configured by the RAN 604 to utilize both cellular radio resources and WLAN resources.

The RAN 604 may include one or more access nodes, for example, AN 608. AN 608 may terminate air-interface protocols for the UE 602 by providing access stratum protocols including RRC, PDCP, RLC, MAC, and L1 protocols. In this manner, the AN 608 may enable data/voice connectivity between CN 620 and the UE 602. In some embodiments, the AN 608 may be implemented in a discrete device or as one or more software entities running on server computers as part of, for example, a virtual network, which may be referred to as a CRAN or virtual baseband unit pool. The AN 608 be referred to as a BS, gNB, RAN node, eNB, ng-eNB, NodeB, RSU, TRxP, TRP, etc. The AN 608 may be a macrocell base station or a low power base station for providing femtocells, picocells or other like cells having smaller coverage areas, smaller user capacity, or higher bandwidth compared to macrocells.

In embodiments in which the RAN 604 includes a plurality of ANs, they may be coupled with one another via an X2 interface (if the RAN 604 is an LTE RAN) or an Xn interface (if the RAN 604 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 604 may each manage one or more cells, cell groups, component carriers, etc. to provide the UE 602 with an air interface for network access. The UE 602 may be simultaneously connected with a plurality of cells provided by the same or different ANs of the RAN 604. For example, the UE 602 and RAN 604 may use carrier aggregation to allow the UE 602 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 604 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 602 or AN 608 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 604 may be an LTE RAN 610 with eNBs, for example, eNB 612. The LTE RAN 610 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 604 may be an NG-RAN 614 with gNBs, for example, gNB 616, or ng-eNBs, for example, ng-eNB 618. The gNB 616 may connect with 5G-enabled UEs using a 5G NR interface. The gNB 616 may connect with a 5G core through an NG interface, which may include an N2 interface or an N3 interface. The ng-eNB 618 may also connect with the 5G core through an NG interface, but may connect with a UE via an LTE air interface. The gNB 616 and the ng-eNB 618 may connect with each other over an Xn interface.

In some embodiments, the NG interface may be split into two parts, an NG user plane (NG-U) interface, which carries traffic data between the nodes of the NG-RAN 614 and a UPF 648 (e.g., N3 interface), and an NG control plane (NG-C) interface, which is a signaling interface between the nodes of the NG-RAN 614 and an AMF 644 (e.g., N2 interface).

The NG-RAN 614 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 602 can be configured with multiple BWPs where each BWP configuration has a different SCS. When a BWP change is indicated to the UE 602, the SCS of the transmission is changed as well. Another use case example of BWP is related to power saving. In particular, multiple BWPs can be configured for the UE 602 with different amount of frequency resources (for example, PRBs) to support data transmission under different traffic loading scenarios. A BWP containing a smaller number of PRBs can be used for data transmission with small traffic load while allowing power saving at the UE 602 and in some cases at the gNB 616. A BWP containing a larger number of PRBs can be used for scenarios with higher traffic load.

The RAN 604 is communicatively coupled to CN 620 that includes network elements to provide various functions to support data and telecommunications services to customers/subscribers (for example, users of UE 602). The components of the CN 620 may be implemented in one physical node or separate physical nodes. In some embodiments, NFV may be utilized to virtualize any or all of the functions provided by the network elements of the CN 620 onto physical compute/storage resources in servers, switches, etc. A logical instantiation of the CN 620 may be referred to as a network slice, and a logical instantiation of a portion of the CN 620 may be referred to as a network sub-slice.

In some embodiments, the CN 620 may be an LTE CN 622, which may also be referred to as an EPC. The LTE CN 622 may include MME 624, SGW 626, SGSN 628, HSS 630, PGW 632, and PCRF 634 coupled with one another over interfaces (or "reference points") as shown. Functions of the elements of the LTE CN 622 may be briefly introduced as follows.

The MME 624 may implement mobility management functions to track a current location of the UE 602 to facilitate paging, bearer activation/deactivation, handovers, gateway selection, authentication, etc.

The SGW 626 may terminate an S1 interface toward the RAN and route data packets between the RAN and the LTE CN 622. The SGW 626 may be a local mobility anchor point for inter-RAN node handovers and also may provide an anchor for inter-3GPP mobility. Other responsibilities may include lawful intercept, charging, and some policy enforcement.

The SGSN 628 may track a location of the UE 602 and perform security functions and access control. In addition, the SGSN 628 may perform inter-EPC node signaling for mobility between different RAT networks; PDN and S-GW selection as specified by MME 624; MME selection for handovers; etc. The S3 reference point between the MME 624 and the SGSN 628 may enable user and bearer information exchange for inter-3GPP access network mobility in idle/active states.

The HSS 630 may include a database for network users, including subscription-related information to support the network entities' handling of communication sessions. The HSS 630 can provide support for routing/roaming, authentication, authorization, naming/addressing resolution, location dependencies, etc. An S6a reference point between the HSS 630 and the MME 624 may enable transfer of subscription and authentication data for authenticating/authorizing user access to the LTE CN 620.

The PGW 632 may terminate an SGi interface toward a data network (DN) 636 that may include an application/content server 638. The PGW 632 may route data packets between the LTE CN 622 and the data network 636. The PGW 632 may be coupled with the SGW 626 by an S5 reference point to facilitate user plane tunneling and tunnel management. The PGW 632 may further include a node for policy enforcement and charging data collection (for example, PCEF). Additionally, the SGi reference point between the PGW 632 and the data network 636 may be an operator external public, a private PDN, or an intra-operator packet data network, for example, for provision of IMS services. The PGW 632 may be coupled with a PCRF 634 via a Gx reference point.

The PCRF 634 is the policy and charging control element of the LTE CN 622. The PCRF 634 may be communicatively coupled to the app/content server 638 to determine appropriate QoS and charging parameters for service flows. The PCRF 632 may provision associated rules into a PCEF (via Gx reference point) with appropriate TFT and QCI.

In some embodiments, the CN 620 may be a 5GC 640. The 5GC 640 may include an AUSF 642, AMF 644, SMF 646, UPF 648, NSSF 650, NEF 652, NRF 654, PCF 656, UDM 658, and AF 660 coupled with one another over interfaces (or "reference points") as shown. Functions of the elements of the 5GC 640 may be briefly introduced as follows.

The AUSF 642 may store data for authentication of UE 602 and handle authentication-related functionality. The AUSF 642 may facilitate a common authentication framework for various access types. In addition to communicating with other elements of the 5GC 640 over reference points as shown, the AUSF 642 may exhibit an Nausf service-based interface.

The AMF 644 may allow other functions of the 5GC 640 to communicate with the UE 602 and the RAN 604 and to subscribe to notifications about mobility events with respect to the UE 602. The AMF 644 may be responsible for registration management (for example, for registering UE 602), connection management, reachability management, mobility management, lawful interception of AMF-related events, and access authentication and authorization. The AMF 644 may provide transport for SM messages between the UE 602 and the SMF 646, and act as a transparent proxy for routing SM messages. AMF 644 may also provide transport for SMS messages between UE 602 and an SMSF. AMF 644 may interact with the AUSF 642 and the UE 602 to perform various security anchor and context management functions. Furthermore, AMF 644 may be a termination point of a RAN CP interface, which may include or be an N2 reference point between the RAN 604 and the AMF 644; and the AMF 644 may be a termination point of NAS (N1) signaling, and perform NAS ciphering and integrity protection. AMF 644 may also support NAS signaling with the UE 602 over an N3 IWF interface.

The SMF 646 may be responsible for SM (for example, session establishment, tunnel management between UPF 648 and AN 608); UE IP address allocation and management (including optional authorization); selection and control of UP function; configuring traffic steering at UPF 648 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 644 over N2 to AN 608; and determining SSC mode of a session. SM may refer to management of a PDU session, and a PDU session or "session" may refer to a PDU connectivity service that provides or enables the exchange of PDUs between the UE 602 and the data network 636.

The UPF 648 may act as an anchor point for intra-RAT and inter-RAT mobility, an external PDU session point of interconnect to data network 636, and a branching point to support multi-homed PDU session. The UPF 648 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 648 may include an uplink classifier to support routing traffic flows to a data network.

The NSSF 650 may select a set of network slice instances serving the UE 602. The NSSF 650 may also determine allowed NSSAI and the mapping to the subscribed S-NS-SAIs, if needed. The NSSF 650 may also determine the AMF set to be used to serve the UE 602, or a list of candidate AMFs based on a suitable configuration and possibly by querying the NRF 654. The selection of a set of network slice instances for the UE 602 may be triggered by the AMF 644 with which the UE 602 is registered by interacting with the NSSF 650, which may lead to a change of AMF. The NSSF 650 may interact with the AMF 644 via an N22 reference point; and may communicate with another NSSF in a visited network via an N31 reference point (not shown). Additionally, the NSSF 650 may exhibit an Nnssf service-based interface.

The NEF 652 may securely expose services and capabilities provided by 3GPP network functions for third party, internal exposure/re-exposure, AFs (e.g., AF 660), edge computing or fog computing systems, etc. In such embodiments, the NEF 652 may authenticate, authorize, or throttle the AFs. NEF 652 may also translate information exchanged with the AF 660 and information exchanged with internal network functions. For example, the NEF 652 may translate between an AF-Service-Identifier and an internal 5GC information. NEF 652 may also receive information from other NFs based on exposed capabilities of other NFs. This information may be stored at the NEF 652 as structured data, or at a data storage NF using standardized interfaces. The stored information can then be re-exposed by the NEF 652 to other NFs and AFs, or used for other purposes such as analytics. Additionally, the NEF 652 may exhibit an Nnef service-based interface.

The NRF 654 may support service discovery functions, receive NF discovery requests from NF instances, and provide the information of the discovered NF instances to the NF instances. NRF 654 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 654 may exhibit the Nnrf service-based interface.

The PCF 656 may provide policy rules to control plane functions to enforce them, and may also support unified policy framework to govern network behavior. The PCF 656 may also implement a front end to access subscription information relevant for policy decisions in a UDR of the UDM 658. In addition to communicating with functions over reference points as shown, the PCF 656 exhibit an Npcf service-based interface.

The UDM 658 may handle subscription-related information to support the network entities' handling of communication sessions, and may store subscription data of UE 602. For example, subscription data may be communicated via an N8 reference point between the UDM 658 and the AMF 644. The UDM 658 may include two parts, an application front end and a UDR. The UDR may store subscription data and policy data for the UDM 658 and the PCF 656, and/or structured data for exposure and application data (including PFDs for application detection, application request information for multiple UEs 602) for the NEF 652. The Nudr service-based interface may be exhibited by the UDR 221 to allow the UDM 658, PCF 656, and NEF 652 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 658 may exhibit the Nudm service-based interface.

The AF 660 may provide application influence on traffic routing, provide access to NEF, and interact with the policy framework for policy control.

In some embodiments, the 5GC 640 may enable edge computing by selecting operator/3$^{rd}$ party services to be geographically close to a point that the UE 602 is attached to the network. This may reduce latency and load on the network. To provide edge-computing implementations, the 5GC 640 may select a UPF 648 close to the UE 602 and execute traffic steering from the UPF 648 to data network 636 via the N6 interface. This may be based on the UE subscription data, UE location, and information provided by the AF 660. In this way, the AF 660 may influence UPF (re)selection and traffic routing. Based on operator deployment, when AF 660 is considered to be a trusted entity, the network operator may permit AF 660 to interact directly with relevant NFs. Additionally, the AF 660 may exhibit an Naf service-based interface.

The data network 636 may represent various network operator services, Internet access, or third party services that may be provided by one or more servers including, for example, application/content server 638.

FIG. 7 schematically illustrates a wireless network 700 in accordance with various embodiments. The wireless network 700 may include a UE 702 in wireless communication with an AN 704. The UE 702 and AN 704 may be similar to, and substantially interchangeable with, like-named components described elsewhere herein.

The UE 702 may be communicatively coupled with the AN 704 via connection 706. The connection 706 is illustrated as an air interface to enable communicative coupling, and can be consistent with cellular communications protocols such as an LTE protocol or a 5G NR protocol operating at mmWave or sub-6 GHz frequencies.

The UE 702 may include a host platform 708 coupled with a modem platform 710. The host platform 708 may include application processing circuitry 712, which may be coupled with protocol processing circuitry 714 of the modem platform 710. The application processing circuitry 712 may run various applications for the UE 702 that source/sink application data. The application processing circuitry 712 may further implement one or more layer operations to transmit/receive application data to/from a data network. These layer operations may include transport (for example UDP) and Internet (for example, IP) operations The protocol processing circuitry 714 may implement one or more of layer operations to facilitate transmission or reception of data over the connection 706. The layer operations implemented by the protocol processing circuitry 714 may include, for example, MAC, RLC, PDCP, RRC and NAS operations.

The modem platform 710 may further include digital baseband circuitry 716 that may implement one or more layer operations that are "below" layer operations performed by the protocol processing circuitry 714 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 710 may further include transmit circuitry 718, receive circuitry 720, RF circuitry 722, and RF front end (RFFE) 724, which may include or connect to one or more antenna panels 726. Briefly, the transmit circuitry 718 may include a digital-to-analog converter, mixer, intermediate frequency (IF) components, etc.; the receive circuitry 720 may include an analog-to-digital converter, mixer, IF components, etc.; the RF circuitry 722 may include a low-noise amplifier, a power amplifier, power tracking components, etc.; RFFE 724 may include filters (for example, surface/bulk acoustic wave filters), switches, antenna tuners, beamforming components (for example, phase-array antenna components), etc. The selection and arrangement of the components of the transmit circuitry 718, receive circuitry 720, RF circuitry 722, RFFE 724, and antenna panels 726 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 714 may include one or more instances of control circuitry (not shown) to provide control functions for the transmit/receive components.

A UE reception may be established by and via the antenna panels 726, RFFE 724, RF circuitry 722, receive circuitry 720, digital baseband circuitry 716, and protocol processing circuitry 714. In some embodiments, the antenna panels 726 may receive a transmission from the AN 704 by receive-beamforming signals received by a plurality of antennas/antenna elements of the one or more antenna panels 726.

A UE transmission may be established by and via the protocol processing circuitry 714, digital baseband circuitry 716, transmit circuitry 718, RF circuitry 722, RFFE 724, and antenna panels 726. In some embodiments, the transmit components of the UE 704 may apply a spatial filter to the data to be transmitted to form a transmit beam emitted by the antenna elements of the antenna panels 726.

Similar to the UE 702, the AN 704 may include a host platform 728 coupled with a modem platform 730. The host platform 728 may include application processing circuitry 732 coupled with protocol processing circuitry 734 of the modem platform 730. The modem platform may further include digital baseband circuitry 736, transmit circuitry 738, receive circuitry 740, RF circuitry 742, RFFE circuitry 744, and antenna panels 746. The components of the AN 704 may be similar to and substantially interchangeable with like-named components of the UE 702. In addition to performing data transmission/reception as described above, the components of the AN 708 may perform various logical functions that include, for example, RNC functions such as radio bearer management, uplink and downlink dynamic radio resource management, and data packet scheduling.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840 or other interface circuitry. For embodiments where node virtualization (e.g., NFV) is utilized, a hypervisor 802 may be executed to provide an execution environment for one or more network slices/sub-slices to utilize the hardware resources 800.

The processors 810 may include, for example, a processor 812 and a processor 814. The processors 810 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 820 may include main memory, disk storage, or any suitable combination thereof. The memory/storage devices 820 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 830 may include interconnection or network interface controllers, components, or other suitable devices to communicate with one or more peripheral devices 804 or one or more databases 806 or other network elements via a network 808. For example, the communication resources 830 may include wired communication components (e.g., for coupling via USB, Ethernet, etc.), cellular communication components, NFC components, Bluetooth® (or Bluetooth® Low Energy) components, Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Example Procedures

Figure 9:
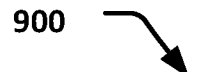

In some embodiments, the electronic device(s), network(s), system(s), chip(s) or component(s), or portions or implementations thereof, of FIGS. 6-8, or some other figure herein, may be configured to perform one or more processes, techniques, or methods as described herein, or portions thereof. One such process 900 is depicted in FIG. 9. In some embodiments, the process 900 may be performed by a UE or a portion thereof. For example, the process 900 may include, at 902, determining that multiple aperiodic SRS resource sets are triggered to be transmitted in a same slot across different component carriers (CCs). At 904, the process 900 may further include dropping transmission of one or more of the SRS resource sets according to a dropping rule. For example, the SRS resource sets may be prioritized based on SRS usage, a CC ID, and/or a SRS resource set ID.

FIG. 10 illustrates another process 1000 in accordance with various embodiments. The process 1000 may be performed by a UE or a portion thereof. At 1002, the process 1000 may include receiving configuration information for a first sounding reference signal (SRS) resource set and a second SRS resource set, wherein there is a guard period between SRS occasions of the first SRS resource set and respective SRS occasions of the second SRS resource set. At 1004, the process 1004 may further include determining that a first SRS occasion of the first SRS resource set and a second SRS occasion of the second SRS resource set are dropped based on a collision handling rule. At 1006, the process 1000 may further include encoding an uplink message for transmission in the guard period between the first and second SRS occasions based on the determination. In some embodiments, the first and second SRS occasions may be in different component carriers. The first and second SRS occasions may be in the same slot or different slots. When the first and second SRS occasions are in different slots, the guard period may be entirely in one of the slots or may include resources of both slots.

Figure 11:
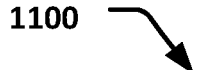

FIG. 11 illustrates another process 1100 in accordance with various embodiments. The process 1100 may be performed by a UE or a portion thereof. At 1102, the process 1100 may include determining to drop a first sounding reference signal (SRS) occasion of a first SRS resource set and a second SRS occasion of a second SRS resource set based on a collision handling rule, wherein the first and second SRS occasions are in different component carriers. At 1104, the process 1100 may further include dropping a gap period between the first and second SRS occasions based on the determination.

While processes 900, 1000, and 1100 are described from the perspective of the UE, it will be understood that similar processes may be performed at the network side (e.g., by a gNB).

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Some non-limiting Examples of various embodiments are provided below.

Example A1 may include one or more computer-readable media (CRM) having instructions, stored thereon, that when executed by one or more processors cause a user equipment (UE) to: receive configuration information for a first sounding reference signal (SRS) resource set and a second SRS resource set, wherein there is a guard period between SRS occasions of the first SRS resource set and respective SRS occasions of the second SRS resource set; determine that a first SRS occasion of the first SRS resource set and a second SRS occasion of the second SRS resource set are dropped based on a collision handling rule; and encode an uplink message for transmission in the guard period between the first and second SRS occasions based on the determination.

Example A2 may include the one or more CRM of example A1, wherein the first SRS resource set, the second resource set, and the guard period have a same priority associated with the collision handling rule.

Example A3 may include the one or more CRM of example A1, wherein the first and second SRS occasions are aperiodic SRS occasions.

Example A4 may include the one or more CRM of example A1, wherein the first and second SRS occasions are in a same slot.

Example A5 may include the one or more CRM of example A1, wherein the first and second SRS occasions are in different slots.

Example A6 may include the one or more CRM of any one of examples A1-A5, wherein the first and second SRS resource sets are in different component carriers.

Example A7 may include the one or more CRM of any one of examples A1-A5, wherein the uplink message is a physical uplink shared channel (PUSCH) message or a physical uplink control channel (PUCCH) message.

Example A8 may include an apparatus to be implemented in a user equipment (UE), the apparatus comprising: a memory to store a collision handling rule; and processor circuitry coupled to the memory, the processor circuitry to: determine to drop a first sounding reference signal (SRS) occasion of a first SRS resource set and a second SRS occasion of a second SRS resource set based on the collision handling rule, wherein the first and second SRS occasions are in different component carriers; and drop a gap period between the first and second SRS occasions based on the determination.

Example A9 may include the apparatus of example A8, wherein the processor circuitry is further to encode a physical uplink shared channel (PUSCH) message or a physical uplink control channel (PUCCH) message for transmission in the gap period.

Example A10 may include the apparatus of example A8, wherein the first SRS resource set, the second resource set, and the gap period have a same priority associated with the collision handling rule.

Example A11 may include the apparatus of example A8, wherein the first and second SRS occasions are aperiodic SRS occasions.

Example A12 may include the apparatus of any one of examples A8-A11, wherein the first and second SRS occasions are in a same slot.

Example A13 may include the apparatus of any one of examples A8-A12, wherein the first and second SRS occasions are in different slots.

Example A14 may include one or more computer-readable media (CRM) having instructions, stored thereon, that when executed by one or more processors cause a user equipment (UE) to: determine that multiple aperiodic SRS resource sets are triggered to be transmitted in a same slot across different component carriers (CCs); and drop transmission of one or more of the SRS resource sets according to a dropping rule.

Example A15 may include the one or more CRM of example A14, wherein the transmission is dropped if simultaneous transmission of the multiple aperiodic SRS resource sets over multiple CCs exceeds a capability of the UE.

Example A16 may include the one or more CRM of example A14, wherein the dropping rule includes to prioritize the respective SRS resource sets based on a SRS usage.

Example A17 may include the one or more CRM of example A16, wherein the SRS resource sets are prioritized further based on a component carrier ID or a SRS resource set ID.

Example A18 may include the one or more CRM of example A14, wherein a time period between a first SRS resource and a second SRS resource is greater than a required gap length, and wherein the instructions, when executed, are further to cause the UE to identify a set of symbols between the first and second SRS resources for a gap period.

Example A19 may include the one or more CRM of example A18, wherein the set of symbols for the gap period are predefined or configured via a message received from a next generation Node B (gNB).

Example A20 may include the one or more CRM of example A18, wherein the set of symbols immediately follows the first SRS resource or immediately precedes the second SRS resource.

Example A21 may include the one or more CRM of any of examples A14-A20, wherein the instructions, when executed, are further to cause the UE to perform collision handling for a gap period between the first and second SRS resources using a priority that is the same for the gap period as for one or both of the first and second SRS resources.

Example B1 may include a method of a gNB or UE, wherein the gNB configures the UE for SRS transmission.

Example B2 may include the method of example B1 or some other example herein, wherein when multiple aperiodic SRS resource sets are triggered to be transmitted in the same slot across different component carriers (CCs), if the simultaneous transmission over multiple CCs exceeds UE's capability, the dropping rule should be defined to handle the collision.

Example B3 may include the method of example B2 or some other example herein, wherein the SRS prioritization is based on SRS usage. If the collision happens among SRS with the same usage, then the SRS could be further prioritized by component carrier ID or SRS resource set ID.

Example B4 may include the method of example B2 or some other example herein, wherein the SRS prioritization is based on component carrier ID or the SRS prioritization is based on SRS resource set ID.

Example B5 may include the method of example B1 or some other example herein, wherein when aperiodic SRS triggered in one CC collides with periodic/semi-persistent SRS over another CC, if the simultaneous transmission over multiple CCs exceeds UE's capability, there should be some rules to handle the collision.

Example B6 may include the method of example B5 or some other example herein, wherein the aperiodic SRS should be prioritized over periodic/semi-persistent SRS or the periodic/semi-persistent SRS is prioritized over aperiodic SRS. Or the SRS prioritization is based on SRS usage. If the collision happens among SRS with the same usage, then the SRS could be further prioritized by component carrier ID or SRS resource set ID.

Example B7 may include the method of example B1 or some other example herein, wherein when periodic SRS in one CC collides with semi-persistent SRS over another CC, if the simultaneous transmission over multiple CCs exceeds UE's capability, there should be some rules to handle the collision.

Example B8 may include the method of example B7 or some other example herein, wherein the semi-persistent SRS should be prioritized over periodic SRS or the periodic SRS is prioritized over semi-persistent SRS. Or the SRS prioritization is based on SRS usage. If the collision happens among SRS with the same usage, then the SRS could be further prioritized by component carrier ID or SRS resource set ID.

Example B9 may include the method of example B1 or some other example herein, wherein new UE capability could be introduced indicating whether the UE supports simultaneous aperiodic SRS transmission over multiple CCs. Another UE capability could be introduced indicating whether UE supports simultaneous aperiodic SRS/periodic SRS/semi-persistent SRS transmission over multiple CCs.

Example B10 may include the method of example B1 or some other example herein, wherein if the UE doesn't support simultaneous transmission for aperiodic SRS over different CC, or simultaneous transmission for aperiodic and periodic/semi-persistent SRS over different CC, or simultaneous transmission for periodic and semi-persistent SRS over different CC, the UE is not expected to be configured with overlapped transmission.

Example B11 may include the method of example B1 or some other example herein, wherein for SRS with antenna switching, if the UE needs to switch antenna panel when transmitting the SRS resources within the same SRS resource set, additional guard period, for example, N symbols (N should be larger than or equal to the panel switching time), should be configured between the SRS resources.

Example B12 may include the method of example B1 or some other example herein, wherein for SRS with antenna switching, if the UE needs to switch antenna panel among different SRS resource sets, the guard period, for example, N symbols (N should be larger than or equal to the panel switching time), should be configured between the SRS resource sets.

Example B13 may include the method of example B1 or some or other example herein, wherein for SRS with antenna switching, if the SRS transmission is before or after other uplink transmission, e.g., PUSCH/PUCCH, and the UE needs to switch antenna/beam/panel between the SRS and PUSCH/PUCCH, the guard period, for example, N symbols (N should be larger than or equal to the beam/antenna/panel switching time), should be configured between the SRS and PUSCH/PUCCH.

Example B14 may include the method of example B1 or some other example herein, wherein for SRS with antenna switching, if the SRS transmission is before or after other uplink transmission, e.g., PUSCH/PUCCH, and the time between SRS and PUSCH/PUCCH is not sufficient for beam/antenna/panel switching, the collision handling should be applied.

Example B15 may include the method of example B14 or some other example herein, wherein the PUSCH/PUCCH should be prioritized for transmission. Some OFDM symbols for SRS transmission will be dropped. Or the SRS should be prioritized for transmission.

Example B16 may include a method of a UE, the method comprising: determining that multiple aperiodic SRS resource sets are triggered to be transmitted in a same slot across different component carriers (CCs); and dropping transmission of one or more of the SRS resource sets according to a dropping rule.

Example B17 may include the method of example B16 or some other example herein, where the transmission is dropped if simultaneous transmission of the multiple aperiodic SRS resource sets over multiple CCs exceeds a capability of the UE.

Example B18 may include the method of example B16-B17 or some other example herein, wherein the dropping rule includes prioritizing SRS resource sets based on SRS usage.

Example B19 may include the method of example B18 or some other example herein, wherein the SRS resource sets are prioritized further based on a component carrier ID or a SRS resource set ID.

Example B20 may include the method of example B16-B17 or some other example herein, wherein the dropping rule includes prioritizing SRS resource sets based on a component carrier ID or a SRS resource set ID.

Example B21 may include the method of example B16-B20 or some other example herein, wherein a time period between a first SRS resource and a second SRS resource is greater than a required gap length, and wherein the method further comprises determining OFDM symbols between the first and second SRS resources for a gap period.

Example B22 may include the method of example B21 or some other example herein, wherein the OFDM symbols for the gap period are predefined or configured (e.g., by RRC, MAC CE, and/or DCI).

Example B23 may include the method of example B21-B22 or some other example herein, wherein the determined OFDM symbols immediately follow the first SRS resource or immediately precede the second SRS resource.

Example B24 may include the method of example B21-B23 or some other example herein, further comprising performing collision handling using a priority handling rule for the gap period that is the same as a priority handling rule for a configured SRS.

Example Z01 may include an apparatus comprising means to perform one or more elements of a method described in or related to any of examples A1-A21, B1-B24, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A1-A21, B1-B24, or any other method or process described herein.

Example Z03 may include an apparatus comprising logic, modules, or circuitry to perform one or more elements of a method described in or related to any of examples A1-A21, B1-B24, or any other method or process described herein.

Example Z04 may include a method, technique, or process as described in or related to any of examples A1-A21, B1-B24, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A1-A21, B1-B24, or portions thereof.

Example Z06 may include a signal as described in or related to any of examples A1-A21, B1-B24, or portions or parts thereof.

Example Z07 may include a datagram, packet, frame, segment, protocol data unit (PDU), or message as described in or related to any of examples A1-A21, B1-B24, or portions or parts thereof, or otherwise described in the present disclosure.

Example Z08 may include a signal encoded with data as described in or related to any of examples A1-A21, B1-B24, or portions or parts thereof, or otherwise described in the present disclosure.

Example Z09 may include a signal encoded with a datagram, packet, frame, segment, protocol data unit (PDU), or message as described in or related to any of examples A1-A21, B1-B24, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A1-A21, B1-B24, or portions thereof.

Example Z11 may include a computer program comprising instructions, wherein execution of the program by a processing element is to cause the processing element to carry out the method, techniques, or process as described in or related to any of examples A1-A21, B1-B24, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v 16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |

-continued

| | |
|---|---|
| CG | Cell Group |
| CGF | Charging Gateway Function |
| CHF | Charging Function |
| CI | Cell Identity |
| CID | Cell-ID (e g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |

-continued

| EHE | Edge Hosting Environment |
|---|---|
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |

-continued

| HSPA | High Speed Packet Access |
|---|---|
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |

-continued

| | |
|---|---|
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTCmassive | MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |

-continued

| | |
|---|---|
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |

-continued

-continued

| | |
|---|---|
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time Rx Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |

| | |
|---|---|
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH Block SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |

-continued

| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, VLAN Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed by one or more processors cause a user equipment (UE) to:

receive configuration information for a first sounding reference signal (SRS) resource set and a second SRS resource set, wherein there is a guard period between SRS occasions of the first SRS resource set and respective SRS occasions of the second SRS resource set;

determine that a first SRS occasion of the first SRS resource set and a second SRS occasion of the second SRS resource set are dropped based on a collision handling rule; and encode an uplink message comprising a physical uplink shared channel (PUSCH) message or a physical uplink control channel (PUCCH) message for transmission in the guard period between the first and second SRS occasions based on the determination.

2. The one or more NTCRM of claim 1, wherein the first SRS resource set, the second resource set, and the guard period have a same priority associated with the collision handling rule.

3. The one or more NTCRM of claim 1, wherein the first and second SRS occasions are aperiodic SRS occasions.

4. The one or more NTCRM of claim 1, wherein the first and second SRS occasions are in a same slot.

5. The one or more NTCRM of claim 1, wherein the first and second SRS occasions are in different slots.

6. The one or more NTCRM of claim 1, wherein the first and second SRS resource sets are in different component carriers.

7. The one or more NTCRM of claim 1, wherein the uplink message is a physical uplink shared channel (PUSCH) message or a physical uplink control channel (PUCCH) message.

8. An apparatus to be implemented in a user equipment (UE), the apparatus comprising:

a memory to store a collision handling rule; and processor circuitry coupled to the memory, the processor circuitry to:

determine to drop a first sounding reference signal (SRS) occasion of a first SRS resource set and a second SRS occasion of a second SRS resource set based on the collision handling rule, wherein the first and second SRS occasions are in different component carriers;

drop a gap period between the first and second SRS occasions based on the determination; and encode a physical uplink shared channel (PUSCH) message or a physical uplink control channel (PUCCH) message for transmission in the gap period.

9. The apparatus of claim 8, wherein the processor circuitry is further to encode a physical uplink shared channel (PUSCH) message or a physical uplink control channel (PUCCH) message for transmission in the gap period.

10. The apparatus of claim 8, wherein the first SRS resource set, the second resource set, and the gap period have a same priority associated with the collision handling rule.

11. The apparatus of claim 8, wherein the first and second SRS occasions are aperiodic SRS occasions.

12. The apparatus of claim 8, wherein the first and second SRS occasions are in a same slot or in different slots.

13. One or more non-transitory computer-readable media (NTCRM) having instructions, stored thereon, that when executed by one or more processors cause a user equipment (UE) to:

determine that multiple aperiodic SRS resource sets are triggered to be transmitted in a same slot across different component carriers (CCs); and drop transmission of one or more of the SRS resource sets according to a dropping rule, wherein the dropping rule is based on a user equipment (UE) capability.

14. The one or more NTCRM of claim 13, wherein the transmission is dropped if simultaneous transmission of the multiple aperiodic SRS resource sets over multiple CCs exceeds a capability of the UE.

15. The one or more NTCRM of claim 13, wherein the dropping rule includes to prioritize the respective SRS resource sets based on a SRS usage.

16. The one or more NTCRM of claim 15, wherein the SRS resource sets are prioritized further based on a component carrier ID or a SRS resource set ID.

17. The one or more NTCRM of claim 13, wherein a time period between a first SRS resource and a second SRS resource is greater than a required gap length, and wherein the instructions, when executed, further cause the UE to identify a set of symbols between the first and second SRS resources for a gap period.

18. The one or more NTCRM of claim 17, wherein the set of symbols for the gap period are predefined or configured via a message received from a next generation Node B (gNB).

19. The one or more NTCRM of claim 17, wherein the set of symbols immediately follows the first SRS resource or immediately precedes the second SRS resource.

20. The one or more NTCRM of claim 17, wherein the instructions, when executed, further cause the UE to perform collision handling for a gap period between the first and second SRS resources using a priority that is the same for the gap period as for one or both of the first and second SRS resources.

\* \* \* \* \*